(12) United States Patent
Jacobsmeyer

(10) Patent No.: US 11,796,125 B1
(45) Date of Patent: Oct. 24, 2023

(54) SECURE WALL HANGER AND METHODS OF USE

(71) Applicant: Don Jacobsmeyer, St. Louis, MO (US)

(72) Inventor: Don Jacobsmeyer, St. Louis, MO (US)

(73) Assignee: Don Jacobsmeyer, St. Louis, MO (US)

( * ) Notice: Subject to any disclaimer, the term of this patent is extended or adjusted under 35 U.S.C. 154(b) by 0 days.

(21) Appl. No.: 17/940,843

(22) Filed: Sep. 8, 2022

(51) Int. Cl.
*A47G 1/16* (2006.01)
*F16M 13/02* (2006.01)

(52) U.S. Cl.
CPC ............... *F16M 13/02* (2013.01); *A47G 1/16* (2013.01)

(58) Field of Classification Search
CPC ........ A47G 1/16; A47G 1/1606; A47G 1/162; A47G 1/1633
USPC ..... 248/489, 490.488, 475.1, 477, 300, 301, 248/304, 339
See application file for complete search history.

(56) References Cited

U.S. PATENT DOCUMENTS

| | | |
|---|---|---|
| 674,438 A | 5/1901 | Edmundson |
| 3,982,719 A | 9/1976 | Kilborne |
| 4,333,625 A * | 6/1982 | Haug ................... A47G 1/20 248/216.1 |
| 4,458,387 A * | 7/1984 | Pearson ............... A47C 31/026 411/442 |
| 4,485,995 A | 12/1984 | Hogg |
| 4,613,108 A | 9/1986 | Sundstrom et al. |
| 4,619,430 A | 10/1986 | Hogg |
| 4,641,807 A | 2/1987 | Phillips |
| D299,003 S | 12/1988 | Fadely, Jr. |
| 5,236,168 A * | 8/1993 | Roy ..................... F16B 15/0015 248/498 |
| 6,095,465 A | 8/2000 | Weck et al. |
| 6,196,506 B1 * | 3/2001 | Wakai ..................... F16B 37/04 248/300 |
| 8,544,806 B1 * | 10/2013 | Dang ....................... A47G 1/20 248/339 |
| 8,667,765 B1 * | 3/2014 | McCarthy ........... E04F 13/0828 52/745.1 |
| 10,206,526 B1 * | 2/2019 | Blakeslee ........... F16B 15/0046 |
| 10,539,266 B2 * | 1/2020 | Will ...................... A47G 1/202 |

* cited by examiner

*Primary Examiner* — Alfred J Wujciak

(74) *Attorney, Agent, or Firm* — Lewis Rice LLC

(57) ABSTRACT

A secure wall hanger having lateral supports is described. In at least some embodiments, the secure wall hanger includes a main body, two lateral supports projecting from the main body, a penetrating element at one end of the main body, and retaining element on an end of the main body opposite to the penetrating element. In some embodiments, each of the lateral supports, as well as the end of the main body having the retaining element, has a securing flap.

19 Claims, 3 Drawing Sheets

SECURE WALL HANGER AND METHODS OF USE

BACKGROUND OF THE INVENTION

1. Field of the Invention

This disclosure is related to the field of wall hangers and, more particularly, to wall hangers for more secure installation in unsupported substrates, such as drywall.

2. Description of the Related Art

Walls for the interiors of homes have evolved over the years. For many years, lath and plaster construction was used to form interior wall constructions throughout much of the developed world. Lath and plaster is a building process used to finish mainly interior dividing walls and ceilings. The building process consists of narrow strips of wood (known as laths) that are nailed horizontally across wall studs, which laths are subsequently coated in plaster. Studs form the main portions of the walls and may carry vertical structural loads or be non-load-bearing, such as in partition walls, which only separate spaces. The studs may hold in place windows, doors, interior finish, exterior sheathing or siding, insulation, and utilities, and may help give shape to a building. The lath and plaster tend to form the bulk of what is seen by someone in the interior of the building and fill in the gaps between studs.

In the early 1900s, interior construction began to transition to the use of drywall, which is also known as plasterboard, sheet rock, and gypsum board. Drywall is a panel made of calcium sulfate dihydrate (gypsum), with or without additives, typically extruded between thick sheets of facer and backer paper, used in the construction of interior walls and ceilings. The gypsum is used to make a plaster that is mixed with fiber (typically paper, glass wool, or a combination of these materials), a plasticizer, a foaming agent, and additives that can reduce mildew, flammability, water absorption, or other factors. The facer and backer papers provide some rigidity while sealing the gypsum mixture in-between.

The adoption of drywall has led to some problems for hanging items from interior walls made with drywall. For example, when hanging something that is not trivially light in weight, such as a modestly-sized picture frame, drywall construction may require a picture frame hanger, such as a nail, be driven into one of the related wall studs. This is because the nail may exert too great a force on the drywall material proximate to the nail, thereby causing the connection between the nail and the drywall to degrade and possibly fail. Further, when the paper around the gypsum is punctured, it may no longer contain the gypsum. As gypsum is lost, the local integrity of the wall may become compromised, leading to potential failure of the wall hanger. Such failures may result in the wall hanger drooping or falling out of the wall, which may, in turn, result in the hanging item falling. Such a fall may damage the item or anything else in the path of the item's fall. Thermal expansion, movement of the building, and movement of the wall may exacerbate these issues, leading to failure. These failure modes were lesser issues when lath and plaster construction was used at least because the lath provided a sturdy connection point for a wall hanger. Drywall construction omits such spanning pieces of lath, leaving only wall studs for a potential secure mounting point for wall hangers like nails. Wall studs are typically spaced around 18 inches apart, which spacing limits where and how objects may be hung from a wall having a drywall construction.

Alternatively, a number of hangers have been proposed to reduce wear and increase the overall security of wall hangers in drywall. Some such wall hangers rely on an increase of surface area of the wall hanger proximate to the drywall material to reduce the pressure exerted on any single point of the drywall wall itself. These hangers include large plastic screws that may be driven into a portion of drywall. The increased diameter of these screws may provide a platform for supporting typical metal screws therein, while interfacing with the drywall at a larger diameter than a typical metal screw or nail. This increased-diameter connection may distribute loads more evenly and to a lesser extent than a nail or other, thinner wall hanger. Other improved hangers may apply a compressive force between the sheets of facer and backer paper of the drywall, thereby reducing movement of the hanger, retaining the gypsum material, and spreading out the forces over a larger volume of the drywall material. However, each of the above solutions, as well as other, similar solutions, has at least one of a number of shortcomings.

For example, these solutions tend to create larger holes in the related drywall material, which larger holes may be difficult to cover or patch up in the future. These solutions tend to be more complicated to install and take longer to install. Many will fail prematurely if installed incorrectly. Further, each solution may still fail over time. And because each solution requires a large hole, follow up maintenance is more difficult and costly. For example, a large hole may require specialized materials to fill in the hole when the wall hanger is removed. This specialized material will typically be installed by professionals, limiting the ability of a typical homeowner to make repairs themselves. And further, most solutions for filling holes in drywall are imperfect, such that the larger the hole to be patched, the greater the likelihood that the end product will not properly blend into the existing drywall.

Accordingly, there is a need in the art for a wall hanger design that is capable of being securely placed into drywall or other substrate material (a receiving surface) without the support of a wall stud and without the need of creating a large hole in the drywall or other substrate material, all while being simple in construction; requiring only simple tools and common knowledge to install properly; and being inexpensive to make.

SUMMARY

The following is a summary of the invention in order to provide a basic understanding of some aspects of the invention. This summary is not intended to identify key or critical elements of the invention or to delineate the scope of the invention. The sole purpose of this section is to present some concepts of the invention in a simplified form as a prelude to the more detailed description that is presented later.

Because of these and other problems in the art, described herein is a wall hanger including a main body having a top side, a bottom side opposite the top side, a right side opposite a left side, and a front side opposite a back side; a first lateral support formed to extend from the left side; a second lateral support formed to extend from the right side; a penetrating element formed to extend from the front side; and a retaining element formed proximate to the back side.

In an embodiment of the wall hanger, the wall hanger is monolithic unit.

In an embodiment of the wall hanger, the wall hanger is formed from a single metal sheet.

In an embodiment of the wall hanger, the main body has a u-shaped cross-section.

In an embodiment of the wall hanger, the retention element extends in a first direction that is defined as the direction from the bottom side to the top side.

In an embodiment of the wall hanger, the first lateral support includes a first retention flap formed to project from the first lateral support, and the second lateral support includes a second retention flap formed to project from the second lateral support.

In an embodiment of the wall hanger, the first retention flap extends from the first lateral support in a second direction opposite to the first direction, and the second retention flap extends from the second lateral support in the second direction.

In an embodiment of the wall hanger, the wall hanger further includes a third retention flap that extends from the main body in the second direction from a position proximate to the retention element.

In an embodiment of the wall hanger, the first retention flap extends from the first lateral support in the first direction, and the second retention flap extends from the second lateral support in the first direction.

In an embodiment of the wall hanger, the retention element is formed by a depression in the top side of the main body, wherein the depression is formed in a first direction that is defined as the direction from the top side to the bottom side.

In an embodiment of the wall hanger, the first lateral support includes a first retention flap formed to project from the first lateral support, and the second lateral support includes a second retention flap formed to project from the second lateral support.

In an embodiment of the wall hanger, the first retention flap extends from the first lateral support in the first direction, and the second retention flap extends from the second lateral support in the first direction.

In an embodiment of the wall hanger, the wall hanger includes a third retention flap that extends from the main body in the second direction from a position proximate to the retention element.

Also described herein is a method of installing a wall hanger, the method includes providing a wall hanger, the wall hanger comprising: a main body having a generally circular cross-section, a top side, a bottom side opposite the top side, a right side opposite a left side, and a front side opposite a back side; a first lateral support formed to extend from the left side; a second lateral support formed to extend from the right side; a penetrating element formed to extend from the front side; and a retaining element formed proximate to the back side; and driving the wall hanger into a receiving surface.

In an embodiment of the method of installing a wall hanger, the method includes a step of hanging an item from the provided wall hanger after the wall hanger is driven into the receiving surface.

In an embodiment of the method of installing a wall hanger, the step of driving the wall hanger into a receiving surface includes driving the wall hanger into the receiving surface to a depth that leaves the portion of the wall hanger proximate to the retaining element uncovered by the receiving surface.

In an embodiment of the method of installing a wall hanger, the step of driving the wall hanger into a receiving surface includes driving the wall hanger into the receiving surface to a depth that causes a retention flap extending from the first lateral surface to abut the receiving surface.

In an embodiment of the method of installing a wall hanger, the main body has a u-shaped cross-section.

In an embodiment of the method of installing a wall hanger, the penetrating element is driven into a stud within the receiving surface.

In an embodiment of the method of installing a wall hanger, the receiving surface is drywall.

DETAILED DESCRIPTION OF THE PREFERRED EMBODIMENT(S)

The following detailed description and disclosure illustrates by way of example and not by way of limitation. This description will clearly enable one skilled in the art to make and use the disclosed systems and methods, and describes several embodiments, adaptations, variations, alternatives and uses of the disclosed systems and methods. As various changes could be made in the above constructions without departing from the scope of the disclosures, it is intended that all matter contained in the description or shown in the accompanying drawings shall be interpreted as illustrative and not in a limiting sense.

This disclosure is directed to a secure wall hanger. The secure wall hanger is typically intended to be used with a drywall wall, but may also be used with other types of walls and in circumstances other than walls where a user intends to hang an item, such as a picture frame, from a potentially loose or shifting substrate. All of these supporting walls and substrates may be collectively referred to as a "receiving surface" herein. Such a secure wall hanger may provide additional stability in such circumstances using a relatively simple device that may be driven into the receiving surface.

A secure wall hanger (100) in accordance with this disclosure is typically used to hang items from a receiving surface and includes a main body (101). The main body (101) is typically designed and constructed to provide an axis to absorb the forces from an impact in the direction of the major axis of the main body (101), such as those forces from a hammer or mallet, thereby driving the secure wall hanger (100) into a related receiving surface. The main body (101) typically has a point at one end to facilitate a transfer of energy from a strike onto the main body (101) into penetrating the related receiving surface, allowing the secure wall hanger (100) to enter into, and be supported by, the related receiving surface. Further, the main body (101) will typically be relatively rigid to ensure an efficient energy transfer and smooth penetration into the related receiving surface.

The main body (101) includes at least one support element attached to and extending from the main body (101). The embodiments depicted in the figures each typically comprise two support elements. These support elements are disposed such that when the secure wall hanger (100) is installed, the support elements extend radially outwards from the main body (101) and are fixed into the structure of the related receiving surface. The support elements may then provide additional support for the weight of whatever may be hung from the secure wall hanger (100). Further, the support elements are typically positioned such that a portion of the secure wall hanger (100) extends outward from the related receiving surface when installed so that there is a protruding surface of the secure wall hanger (100) that may retain something being hung therefrom.

Figure 1:
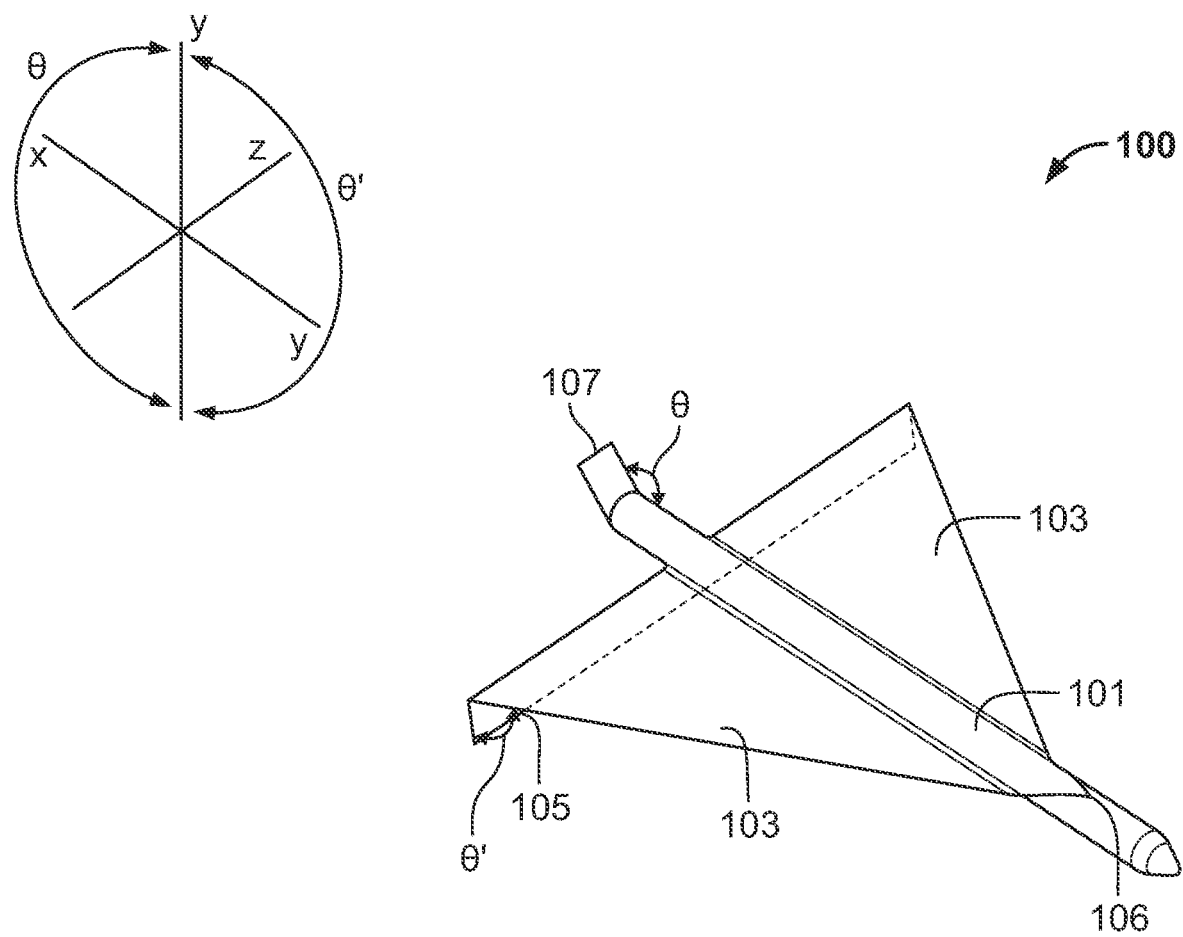
FIG. 1 depicts an embodiment of a secure wall hanger in accordance with this disclosure.

For example, FIG. 1 depicts an embodiment of a secure wall hanger (100). The embodiment of the secure wall hanger (100) depicted in FIG. 1 includes a main body (101). Almost every other structure of the depicted secure wall hanger (100) extends from the main body (101). As shown in FIG. 1, the secure wall hanger (101) includes two lateral supports (103) projecting radially from the main body (101), a penetrating element (106) disposed at a first end of the main body (101), and a retaining element (107) disposed on a second end of the main body (101) opposite to the penetrating element (106). In the embodiment depicted in FIG. 1, each of the lateral supports (103), as well as the end of the main body (101) having the retaining element (107), has a securing element (105). As shown in FIG. 1, the depicted main body (101) is generally in the configuration of an elongated cylinder shape, similar to that of a nail. Alternatively, the shape of the main body (101) may be any shape suitable for receiving the concussive force of a driver (e.g., hammer, mallet) and supporting the other elements of the secure wall hanger. Examples include, but are not limited to, a cross-section that is U-shaped, upside-down U-shaped, circular, semi-circular, square, triangular, ellipsoid, orthogonal, polygonal, and the like. In other embodiments, the configuration may not be strictly cylindrical. By way of example and not limitation, the main body may be conical. Additionally, the main body may be solid or fully or partially hollow.

Each depicted lateral support (103) extends from one of two opposing long sides of the main body (101). The shape of the depicted lateral support (103) is generally in the configuration of a right triangle disposed with one edge generally perpendicular to the major axis of the main body, but other shapes may be used. In the embodiment depicted in FIG. 1, the side of the lateral support (103) closest to the penetrating element (106) slopes away from the main body (101) as shown in FIG. 1. This shape reduces total friction when the secure wall hanger (100) is being inserted into a receiving surface, allowing for gradual penetration and widening of the opening, which makes driving easier and reduces the risk of damage to the receiving surface and hanger.

The depicted lateral supports (103) are substantially planar, with each plane being substantially parallel to the other, extending from opposing sides of the main body (101). However, the lateral supports (103) may extend from the main body (101) at other angles, and the angles for each lateral support (103) may be different. Generally, each lateral support (103) will have a relatively straight side that extends in a direction that is perpendicular to the main axis of the main body (101), such that the surface area of the lateral support (103) is largest in the portion closest to the retention element (107). Further, each of these relatively straight sides is typically parallel to and collinear with the other. This triangular shape will typically make penetration into the receiving surface easier because the sloping sides allow for relatively small increases in surface area being driven into the receiving surface, thereby reducing drag, while the secure wall hanger (100) will be at or near a point of maximum surface area of the lateral supports (103) in contact with the receiving surface itself when driven fully into the receiving surface. The relatively narrow portions of the lateral supports (103) nearest to the penetrating element (106) will typically be positioned beyond the interior surface of the receiving surface when the secure wall hanger (100) is completely driven into the receiving surface.

Additionally, securing flap (105) may be formed along the relatively straight sides of the lateral supports (103). This is because this side of a given lateral support (103) will abut or be adjacent to the outer surface of the receiving surface when the secure wall hanger (101) is inserted. As a result, the securing flaps (105) will extend parallel to, and against, the outer surface of related receiving surface. This both provides a stopping point for driving the hanger and preventing it from being overdriven into the receiving surface, and may also have the effect of stabilizing the secure wall hanger (100) by reducing the amount and extent of material ejected or lost from the receiving surface. In other embodiments, there may be more or less securing flaps (105). In other embodiments, the securing flaps (105) may extend upwards, downwards, or a combination of both, or may extend in opposite directions from one another.

Generally, the length of main body (101), the length that each lateral support (103) extends from the main body (101), and the configuration or design of how the lateral supports (103) are attached or extend from the main body (101) are all selected so that the main body (101) is long enough to be driven deep enough into a related receiving surface to provide a maximum or sufficient amount of the support surface of the lateral supports (103) is disposed in between or at the thickness of the receiving surface itself. In the embodiment depicted in FIG. 1, the length of the main body (101) is about equal to, or slightly longer than, the distance between the tips of the lateral supports (103) of the secure wall hanger (100). Typically, increasing the length of the main body (101) will decrease the rate at which the lateral supports (103) extend away from the main body (101) for a given lateral extension length along the relatively straight sides. This decrease in the rate at which the lateral supports (103) extend away from the main body (101) typically results in a secure wall hanger (100) that requires less peak force to install; minimizes dust produced; allows for easier positioning of the secure wall hanger (100) without twists or turns; and provides other similar and incidental benefits. On the other hand, longer main bodies (101) may have increased expense and issues with stability, resulting in twists or turns of the main body.

The retaining element (107) is formed on an end of the main body (101) opposite to the penetrating element (106). These two ends are typically the ends along the longest axis of the main body (101). The penetrating element (106) will typically have a generally conical or triangular prism shape. In each case, the most distal end of the penetrating element (106) will have a tip or point. This tip or point of the penetrating element (106) will tend to assist the secure wall hanger (100) with penetrating into a receiving surface at least because the reduced surface area of the tip provides increased pressure when thrust into a receiving surface when compared to a wider portion of the secure wall hanger (100).

The retaining element (107) will typically be formed at the end of the main body (101) opposite the penetrating element (106). The retaining element (107) includes some feature that will assist in securing a hanging item on the secure wall hanger (100). For example, and as shown in FIG. 1, the retaining element (107) may be a hook that extends from the top side or end side of the main body (101) in an upward direction. This feature may assist in retaining a hanging item because it creates a vertical barrier for removing the hanging item—the hanging item will need to be lifted over the retaining element (107) to be removed. In other embodiments, the retaining element (107) may have no projection from the main body (101). For example, the retaining element (107) may be a crease or depression formed into the main body (101). In yet other embodiments, the retaining element (107) may include any sort of projection that tends to secure a hanging item to the secure wall hanger (100). For example, the retaining element (107) may include two projections that are narrower than that shown in the figures. Such a two-part retaining element (107) may facility easier manufacturing.

Figure 2:
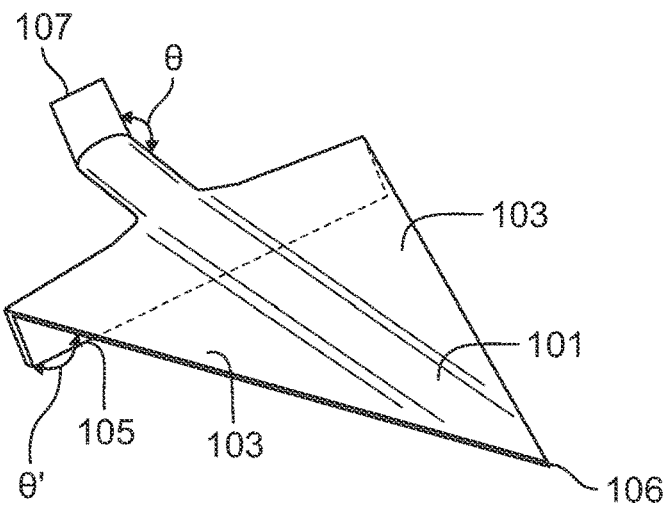
FIG. 2 depicts another embodiment of a secure wall hanger in accordance with this disclosure.
Figure 3:
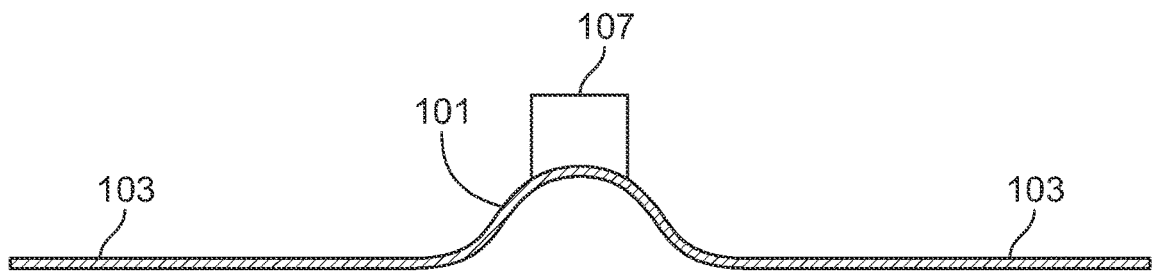
FIG. 3 depicts a side view of the embodiment of a secure wall hanger depicted in FIG. 2 placed within a receiving surface.
Figure 4:
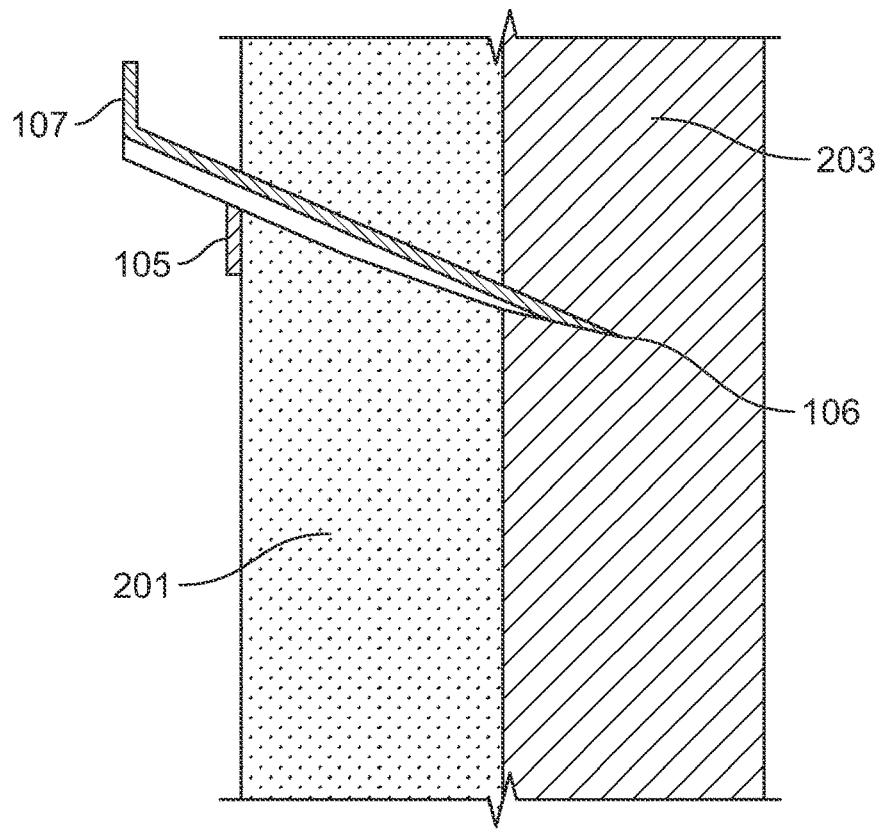
FIG. 4 is a top left perspective view of the embodiment of a secure wall hanger depicted in FIG. 2.

FIGS. 2, 3, and 4 depict another embodiment of a secure wall hanger (100). Like the embodiment discussed above, the embodiment of the secure wall hanger (100) depicted in FIGS. 2, 3, and 4 includes a main body (101). Almost every other structure of the depicted secure wall hanger (100) extends from the main body (101). As shown in FIG. 2, the secure wall hanger (101) includes two lateral supports (103) projecting radially from the main body (101), a penetrating element (106) disposed at a first end of the main body (101), and a retaining element (107) disposed on a second end of the main body (101) opposite to the penetrating element (106). In the embodiment depicted in FIGS. 2 and 4, each of the lateral supports (103) has a securing element (105). FIG. 3 omits the securing elements (105) to better illustrate the overall cross-sectional shape of the secure wall hanger (100).

As clearly shown in FIG. 3, the depicted main body (101) is generally in the configuration of a continuous surface having curves forming a u-shaped portion around the region of the main body (101). The lateral supports (103) are typically coplanar, as shown in FIG. 3. Alternatively, the shape of the main body (101) may curve downward, opposite to what is shown in FIG. 3, or may be any continuous shape, such as a triangular or other shape. These shapes are particularly useful for receiving the concussive force of a driver (e.g., hammer, mallet) and supporting the other elements of the secure wall hanger. Further, such shapes are easily produced by stamping or bending premade sheets of material, such as a metallic material. In some embodiments, the thickness of the secure wall hanger (100) may be the same throughout, or may vary, especially around areas of curvatures or bends.

As shown in FIGS. 2 and 3, each depicted lateral support (103) extends from one of two opposing long sides of the main body (101). The shape of the depicted lateral support (103) is generally in the configuration of a right triangle disposed with one edge generally perpendicular to the major axis of the main body, but other shapes may be used. In the depicted embodiment, the side of the lateral support (103) closest to the penetrating element (106) slopes away from the main body (101) as shown in FIG. 2. The lateral supports (103) begin to extend at the front of the secure wall hanger (100), forming a portion of the penetrating element (106). This shape reduces total friction when the secure wall hanger (100) is being inserted into a receiving surface, allowing for gradual penetration and widening of the opening, which makes driving easier and reduces the risk of damage to the receiving surface and hanger.

Again, the lateral supports (103) depicted in FIGS. 2 and 3 are substantially planar, with each plane being substantially parallel to the other, extending from opposing sides of the main body (101). However, the lateral supports (103) may extend from the main body (101) at other angles, and the angles for each lateral support (103) may be different. Generally, each lateral support (103) will have a relatively straight side that extends in a direction that is perpendicular to the main axis of the main body (101), such that the surface area of the lateral support (103) is largest in the portion closest to the retention element (107). Further, each of these relatively straight sides is typically parallel to and collinear with the other. This triangular shape will typically make penetration into the receiving surface easier because the sloping sides allow for relatively small increases in surface area being driven into the receiving surface, thereby reducing drag, while the secure wall hanger (100) will be at or near a point of maximum surface area of the lateral supports (103) in contact with the receiving surface itself when driven fully into the receiving surface. The relatively narrow portions of the lateral supports (103) nearest to the penetrating element (106) will typically be positioned beyond the interior surface of the receiving surface when the secure wall hanger (100) is completely driven into the receiving surface, as depicted in FIG. 4.

Additionally, securing flap (105) may be formed along the relatively straight sides of the lateral supports (103). This is because this side of a given lateral support (103) will abut or be adjacent to the outer surface of the receiving surface when the secure wall hanger (101) is inserted. As a result, the securing flaps (105) will extend parallel to, and against, the outer surface of related receiving surface when the secure wall hanger (100) is inserted. This both provides a stopping point for driving the hanger and preventing it from being overdriven into the receiving surface, and may also have the effect of stabilizing the secure wall hanger (100) by reducing the amount and extent of material ejected or lost from the receiving surface. In other embodiments, there may be more or less securing flaps (105). In other embodiments, the securing flaps (105) may extend upwards, downwards, or a combination of both, or may extend in opposite directions from one another.

In the embodiment depicted in FIG. 4, the secure wall hanger (100) has been inserted into (and through) a receiving surface (201), which may be a drywall material. FIG. 4 shows that the secure wall hanger (100) has been inserted such that the penetrating element (106) has extended through the receiving surface (201). The secure wall hanger (100) has been inserted at an angle that causes the penetrating element (106) to be lower than the retaining element (107), which angle is not perpendicular to the receiving surface (201). The retaining element (107) may then extend from the main body (101) at an angle theta, which angling may allow the retaining element (107) to extend in a generally upward direction. Similarly, the securing flaps (105) may extend from the main body (101) at the supplementary angle to the angle theta, which may allow the securing flaps (105) to be parallel to and rest against the receiving surface (201). The angling of the secure wall hanger (100) and its securing flaps (105) may allow for the forces from an object hanging from the secure wall hanger (100) at or around the retaining element (107) to further drive the secure wall hanger (100) into the receiving surface (201) during use, rather than work the secure wall hanger (100) like a lever and fulcrum.

Generally, the length of main body (101), the length that each lateral support (103) extends from the main body (101), and the configuration or design of how the lateral supports (103) are attached or extend from the main body (101) are all selected so that the main body (101) is long enough to be driven deep enough into a related receiving surface to provide a maximum or sufficient amount of the support surface of the lateral supports (103) is disposed in between or at the thickness of the receiving surface itself. In the embodiment depicted in FIGS. 2, 3, and 4, the length of the main body (101) is about equal to, or slightly longer than, the distance between the tips of the lateral supports (103) of the secure wall hanger (100). Typically, increasing the length of the main body (101) will decrease the rate at which the lateral supports (103) extend away from the main body (101) for a given lateral extension length along the relatively straight sides. This decrease in the rate at which the lateral supports (103) extend away from the main body (101) typically results in a secure wall hanger (100) that requires less peak force to install; minimizes dust produced; allows for easier positioning of the secure wall hanger (100) without twists or turns; and provides other similar and incidental benefits. On the other hand, longer main bodies (101) may have increased expense and issues with stability, resulting in twists or turns of the main body.

The retaining element (107) is formed on an end of the main body (101) opposite to the penetrating element (106). These two ends are typically the ends along the longest axis of the main body (101). The penetrating element (106) will typically have a generally pointed or narrowed shape. In each case, the most distal end of the penetrating element (106) will have a tip or point. This tip or point of the penetrating element (106) will tend to assist the secure wall hanger (100) with penetrating into a receiving surface at least because the reduced surface area of the tip provides increased pressure when thrust into a receiving surface when compared to a wider portion of the secure wall hanger (100). In an embodiment, the overall length of the main body (101) is effective to cause the secure wall hanger (100) to be disposed within the receiving surface (201) after being fully driven, which avoids the potential problem of striking a stud (203). However, in an alternative embodiment, the penetrating element (106) may be capable of being driven into a stud (203), whether within or beyond the receiving surface (201).

The retaining element (107) will typically be formed at the end of the main body (101) opposite the penetrating element (106). The retaining element (107) includes some feature that will assist in securing a hanging item on the secure wall hanger (100). For example, and as shown in FIGS. 2 and 4, the retaining element (107) may be a hook that extends from the top side or end side of the main body (101) in an upward direction. This feature may assist in retaining a hanging item because it creates a vertical barrier for removing the hanging item—the hanging item will need to be lifted over the retaining element (107) to be removed. In other embodiments, the retaining element (107) may have no projection from the main body (101). For example, the retaining element (107) may be a crease or depression formed into the main body (101). In yet other embodiments, the retaining element (107) may include any sort of projection that tends to secure a hanging item to the secure wall hanger (100). For example, the retaining element (107) may include two projections that are narrower than that shown in the figures. Such a two-part retaining element (107) may facility easier manufacturing.

Typically, all portions of a secure wall hanger (100) are continuous, monolithic object. For example, a secure wall hanger (100) may be fabricated from a single sheet of metal material. However, in some embodiments, the secure wall hanger (100) may be formed from more than one material or a number of distinct parts. For example, the lateral supports (103) may be formed from a part that is distinct from the part that forms the main body (101). These distinct parts may be the same material or different materials. In some embodiments, the secure wall hanger (100) may be formed of a hybrid material including two or more materials formed together, for example, as a laminate.

In some embodiments, the secure wall hanger (100) may be fabricated by cutting a corresponding intermediary shape from a single sheet of material and subsequently bending that intermediary shape of material into the final, intended shape. In other embodiments, the secure wall hanger (100) may be made of a plastic material, or any material or combination of materials that is sufficiently rigid and tough to be driven into a receiving surface and support some items from the retaining element (107). In some embodiments, the secure wall hanger (100) may be fabricated using any method that will produce the intended final result with sufficient accuracy. Typically, such a process will also have low cost and high repeatability.

Figure 5:
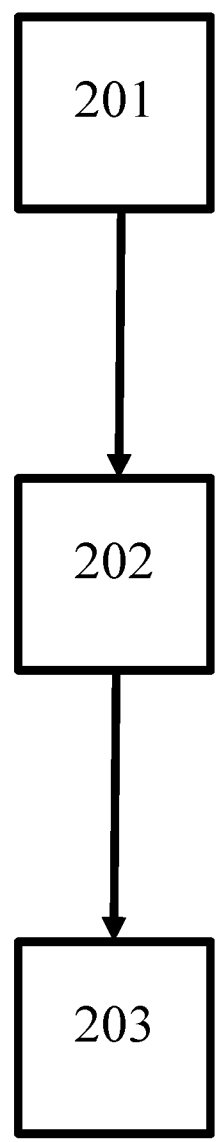
FIG. 5 depicts a flow chart of an exemplary method of using a wall hanger in accordance with this disclosure.

FIG. 5 depicts a flow chart of an exemplary method of using a secure wall hanger (100) in accordance with this disclosure. First (step 201), the secure wall hanger (100) is arranged to be orthogonal from the plane of the outer surface of the receiving surface to which the secure wall hanger (100) will be driven. Typically the penetrating element (106) of the secure wall hanger (100) will be facing the outer surface of the receiving surface. Second (step 202), the secure wall hanger (100) is struck with a tool or by other means such that the secure wall hanger (100) begins to penetrate into the receiving surface. And third and finally (step 203), the secure wall hanger (100) is driven until the lateral supports (103) have sufficient purchase on the substrate itself or the flaps (105) are proximate or adjacent the outer surface of the receiving surface.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

Finally, the qualifier "generally," and similar qualifiers as used in the present case, would be understood by one of ordinary skill in the art to accommodate recognizable attempts to conform a device to the qualified term, which may nevertheless fall short of doing so. This is because terms such as "regular rectangular prism" are purely geometric constructs and no real-world component is a truly "regular rectangular prism" in the geometric sense. Variations from geometric and mathematical descriptions are unavoidable due to, among other things, manufacturing tolerances resulting in shape variations, defects and imperfections, non-uniform thermal expansion, and natural wear.

Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A wall hanger comprising:
   a main body having a top side, a bottom side opposite the top side, a right side opposite a left side, and a front side opposite a back side;
   a first lateral support formed to extend from the left side;
   a second lateral support formed to extend from the right side;
   a penetrating element formed to extend from the front side; and
   a retaining element formed proximate to the back side;
   wherein the main body has a u-shaped cross-section.

2. The wall hanger of claim 1, wherein the wall hanger is a monolithic unit.

3. The wall hanger of claim 2, wherein the wall hanger is formed from a single metal sheet.

4. The wall hanger of claim 1, wherein the retention element extends in a first direction that is defined as the direction from the bottom side to the top side.

5. The wall hanger of claim 4, wherein the first lateral support includes a first retention flap formed to project from the first lateral support, and the second lateral support includes a second retention flap formed to project from the second lateral support.

6. The wall hanger of claim 5, wherein the first retention flap extends from the first lateral support in a second direction opposite to the first direction, and the second retention flap extends from the second lateral support in the second direction.

7. The wall hanger of claim 6, further comprising a third retention flap that extends from the main body in the second direction from a position proximate to the retention element.

8. The wall hanger of claim 5, wherein the first retention flap extends from the first lateral support in the first direction, and the second retention flap extends from the second lateral support in the first direction.

9. The wall hanger of claim 1, wherein the retention element is formed by a depression in the top side of the main body, wherein the depression is formed in a first direction that is defined as the direction from the top side to the bottom side.

10. The wall hanger of claim 9, wherein the first lateral support includes a first retention flap formed to project from the first lateral support, and the second lateral support includes a second retention flap formed to project from the second lateral support.

11. The wall hanger of claim 10, wherein the first retention flap extends from the first lateral support in the first direction, and the second retention flap extends from the second lateral support in the first direction.

12. The wall hanger of claim 11, further comprising a third retention flap that extends from the main body in the second direction from a position proximate to the retention element.

13. A method of installing a wall hanger, the method comprising:
   providing a wall hanger, the wall hanger comprising:
      a main body having a top side, a bottom side opposite the top side, a right side opposite a left side, and a front side opposite a back side;
      a first lateral support formed to extend from the left side;
      a second lateral support formed to extend from the right side;
      a penetrating element formed to extend from the front side; and
      a retaining element formed proximate to the back side;
      wherein the main body has a u-shaped cross-section; and
   driving the wall hanger into a receiving surface.

14. The method of claim 13, further comprising a step of hanging an item from the provided wall hanger after the wall hanger is driven into the receiving surface.

15. The method of claim 14, wherein the step of driving the wall hanger into a receiving surface includes driving the wall hanger into the receiving surface to a depth that leaves the portion of the wall hanger proximate to the retaining element uncovered by the receiving surface.

16. The method of claim 14, wherein the step of driving the wall hanger into a receiving surface includes driving the wall hanger into the receiving surface to a depth that causes a retention flap extending from the first lateral surface to abut the receiving surface.

17. The method of claim 14, wherein the penetrating element is driven into a stud within the receiving surface.

18. The method of claim 17, wherein the receiving surface is drywall.

19. A wall hanger comprising:
   a main body having a top side, a bottom side opposite the top side, a right side opposite a left side, and a front side opposite a back side;
   a first lateral support formed to extend from the left side;
   a second lateral support formed to extend from the right side;
   a penetrating element formed to extend from the front side; and
   a retaining element formed proximate to the back side;
   wherein the main body has a triangular shaped cross-section.

* * * * *